United States Patent
Keyzer et al.

(10) Patent No.: US 12,019,165 B2
(45) Date of Patent: Jun. 25, 2024

(54) DETECTING SATELLITE SIGNAL SPOOFING USING ERROR STATE ESTIMATES

(71) Applicant: Honeywell International Inc., Charlotte, NC (US)

(72) Inventors: Karl Abraham Keyzer, Minneapolis, MN (US); James Arthur McDonald, New Brighton, MN (US); Anthony Pritchard, Coon Rapids, MN (US)

(73) Assignee: Honeywell International Inc., Charlotte, NC (US)

( * ) Notice: Subject to any disclaimer, the term of this patent is extended or adjusted under 35 U.S.C. 154(b) by 160 days.

(21) Appl. No.: 16/999,927

(22) Filed: Aug. 21, 2020

(65) Prior Publication Data
US 2022/0057526 A1    Feb. 24, 2022

(51) Int. Cl.
*G01S 19/21*    (2010.01)
*G01S 19/26*    (2010.01)
*G01S 19/39*    (2010.01)

(52) U.S. Cl.
CPC ............ *G01S 19/215* (2013.01); *G01S 19/26* (2013.01); *G01S 19/396* (2019.08)

(58) Field of Classification Search
CPC ...... G01S 19/215; G01S 19/396; G01S 19/26; G01S 19/20; G01S 19/08; G01S 19/47; G01C 21/165
See application file for complete search history.

(56) References Cited

U.S. PATENT DOCUMENTS

| | | | |
|---|---|---|---|
| 5,557,284 A | | 9/1996 | Hartman |
| 6,496,778 B1 * | | 12/2002 | Lin .......................... G01S 19/55 |
| | | | 701/472 |

(Continued)

FOREIGN PATENT DOCUMENTS

| | | | | |
|---|---|---|---|---|
| CN | 107949795 A | * | 4/2018 | ............. G01S 19/03 |
| CN | 108303720 A | * | 7/2018 | ............. G01S 19/45 |
| CN | 110715660 A | | 1/2020 | |

OTHER PUBLICATIONS

16999927_Jan. 4, 2024_CN_108303720_A_M.pdf, machine translatin of CN-108303720-A (Year: 2018).*

(Continued)

*Primary Examiner* — Timothy A Brainard
*Assistant Examiner* — Kenneth W Good
(74) *Attorney, Agent, or Firm* — Fogg & Powers LLC

(57) ABSTRACT

A system for detecting satellite signal spoofing using error state estimates is provided. The system includes at least one satellite receiver to receive satellite signals, at least one memory and at least one controller. The at least one memory is configured to store at least operation instructions. The at least one controller is in communication with the at least one satellite receiver and the at least one memory. The at least one controller is configured to determine state estimates from the received satellite signals. The at least one controller is further configured to determine error state estimates based at least in part on differences in current state estimates and differences in delayed state estimates. The controller further configured to determine if spoofing is occurring in one more of the received satellite signals when the error state estimates are greater than a select threshold.

20 Claims, 10 Drawing Sheets

(56) References Cited

U.S. PATENT DOCUMENTS

| | | | |
|---|---|---|---|
| 6,859,727 B2* | 2/2005 | Bye | G01C 21/188 |
| | | | 701/536 |
| 7,471,238 B2 | 12/2008 | Lillo et al. | |
| 7,564,401 B1 | 7/2009 | Strachan | |
| 7,626,541 B2* | 12/2009 | Bye | G01S 19/51 |
| | | | 342/357.56 |
| 7,724,184 B2* | 5/2010 | Waid | G01S 19/215 |
| | | | 342/357.59 |
| 7,844,397 B2* | 11/2010 | Lund | G01C 19/58 |
| | | | 701/470 |
| 7,940,213 B2 | 5/2011 | Harper et al. | |
| 8,531,332 B2 | 9/2013 | Gum et al. | |
| 8,589,072 B2* | 11/2013 | Morgan | G01C 21/188 |
| | | | 701/472 |
| 8,600,660 B2* | 12/2013 | Bye | H03H 17/0257 |
| | | | 701/478.5 |
| 9,547,086 B2* | 1/2017 | Dunik | G01C 21/165 |
| 9,557,418 B2* | 1/2017 | Weed | G01S 19/04 |
| 9,625,262 B2* | 4/2017 | Buck | G01C 21/165 |
| 10,996,345 B2* | 5/2021 | Brenner | G01S 19/54 |
| 11,073,620 B2* | 7/2021 | McDonald | G01S 19/20 |
| 11,337,034 B1 | 5/2022 | Doty et al. | |
| 11,442,174 B2* | 9/2022 | Cao | G01S 19/40 |
| 2002/0008661 A1* | 1/2002 | McCall | G01S 19/47 |
| | | | 701/472 |
| 2016/0266259 A1* | 9/2016 | Robinson | G01S 19/46 |
| 2016/0370471 A1* | 12/2016 | Mabuchi | G01S 19/215 |
| 2016/0377726 A1* | 12/2016 | Schipper | G01S 19/215 |
| | | | 342/357.59 |
| 2018/0123680 A1 | 5/2018 | Stolte et al. | |
| 2018/0356529 A1* | 12/2018 | Lee | G01S 1/24 |
| 2019/0377094 A1* | 12/2019 | Lentz | G01S 19/37 |
| 2020/0326428 A1* | 10/2020 | Kana | G01S 19/15 |
| 2020/0348422 A1* | 11/2020 | Carcanague | G01S 19/52 |
| 2021/0109231 A1* | 4/2021 | Söderholm | G01S 19/396 |
| 2022/0026578 A1* | 1/2022 | Pritchard | G01S 19/29 |

OTHER PUBLICATIONS

16999927_Jan. 4, 2024_CN_107949795_A_M.pdf, machine translation of CN-107949795-A (Year: 2018).*
European Patent Office, "Extended European Search Report from EP Application No. 21189988.5", from Foreign Counterpart to U.S. Appl. No. 16/999,927, dated Jan. 4, 2022, pp. 1 through 8, Published: EP.
Han, Shuai, et al., "Antispoofing Raim for Dual-Recursion Particle Filter of GNSS Calculation", IEEE Transactions on Aerospace and Electronic Systems, vol. 52, No. 2, Apr. 2016, pp. 836 through 851.

* cited by examiner

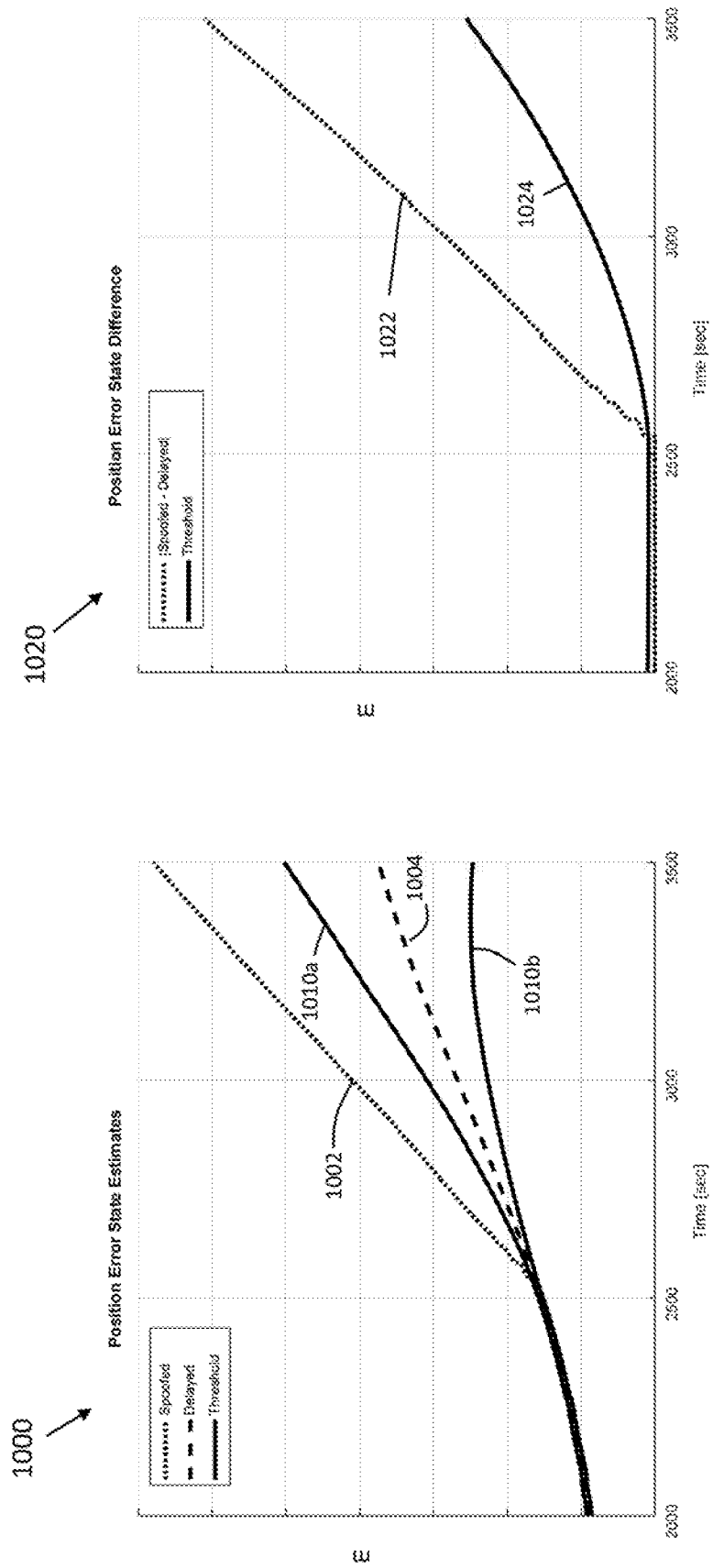

DETECTING SATELLITE SIGNAL SPOOFING USING ERROR STATE ESTIMATES

BACKGROUND

Global Navigation Satellite Systems (GNSS) use a plurality of satellites to generate satellite signals that are received by a global positioning system (GPS) receiver. Information provided by the satellite signals is used to generate navigation solutions such as position and velocity. The satellite signals are susceptible to jamming and spoofing from other signal generating sources. Spoofing radio frequency waveforms mimic true signals and are able to overcome weaker (true) signals originating from satellites in space. The spoofing radio frequency waveforms may deny, degrade, disrupt, or deceive operation of the GPS receiver. This can lead to unacceptably large errors in GPS receiver "snapshot" navigation solutions as well as tightly integrated INS/GPS navigation solution errors that may lead to a loss of integrity for a navigation solution.

Spoofing signals may be generated as a deliberate act or may be an unintentional consequence of a signal generating source. For example, it is common to generate test signals within aircraft maintenance hangars, so technicians providing maintenance on receiver equipment, have reference test signals for the receiver equipment to receive. If a hangar door is left open or the generated test signals are too strong, usually as the result of faulty equipment, the signals my reach out beyond the hangar causing potential spoofing situations in nearby receivers.

The ability to detect spoofed GNSS signals (i.e. signals transmitted from a location other than the satellite itself) is desired so their affects can be mitigated.

SUMMARY

The following summary is made by way of example and not by way of limitation. It is merely provided to aid the reader in understanding some of the aspects of the subject matter described. Embodiments provide a system to detect anomalies in error state estimates that indicate the presence of spoofing in received satellite signals.

In one embodiment, a system for detecting satellite signal spoofing using error state estimates is provided. The system includes at least one satellite receiver to receive satellite signals, at least one memory and at least one controller. The at least one memory is configured to store at least operation instructions. The at least one controller is in communication with the at least one satellite receiver and the at least one memory. The at least one controller is configured to determine state estimates from the received satellite signals. The at least one controller is further configured to determine error state estimates based at least in part on differences in current state estimates and differences in delayed state estimates. The controller is further configured to determine if spoofing is occurring in one more of the received satellite signals when the error state estimates are greater than a select threshold.

In another example embodiment, a method of detecting satellite signal spoofing using error state estimates is provided. The method includes comparing current state estimates with delayed state estimates to determine error state estimates; monitoring the error state estimates; and generating a spoofing alert when the monitored error state estimates indicate error state estimates beyond what is predicted.

In yet another embodiment, a method of detecting satellite signal spoofing using error state estimates is provided. The method includes determining satellite state estimates from received satellite signals; determining sensor state estimates from received sensor signals; comparing the sensor state estimates with the satellite state estimates to determine error state estimates; monitoring the error state estimates; generating a spoofing alert when the monitored error state estimates indicate error state estimates beyond what is predicted; and controlling a navigation system based at least in part on the generated spoofing alert.

BRIEF DESCRIPTION OF THE DRAWINGS

Embodiments can be more easily understood and further advantages and uses thereof will be more readily apparent, when considered in view of the detailed description and the following figures in which:

FIG. 10A illustrates a position error state estimate graph including thresholds according to one exemplary embodiment; and FIG. 10B illustrates a position error state difference graph including thresholds according to one exemplary embodiment.

In accordance with common practice, the various described features are not drawn to scale but are drawn to emphasize specific features relevant to the subject matter described. Reference characters denote like elements throughout figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
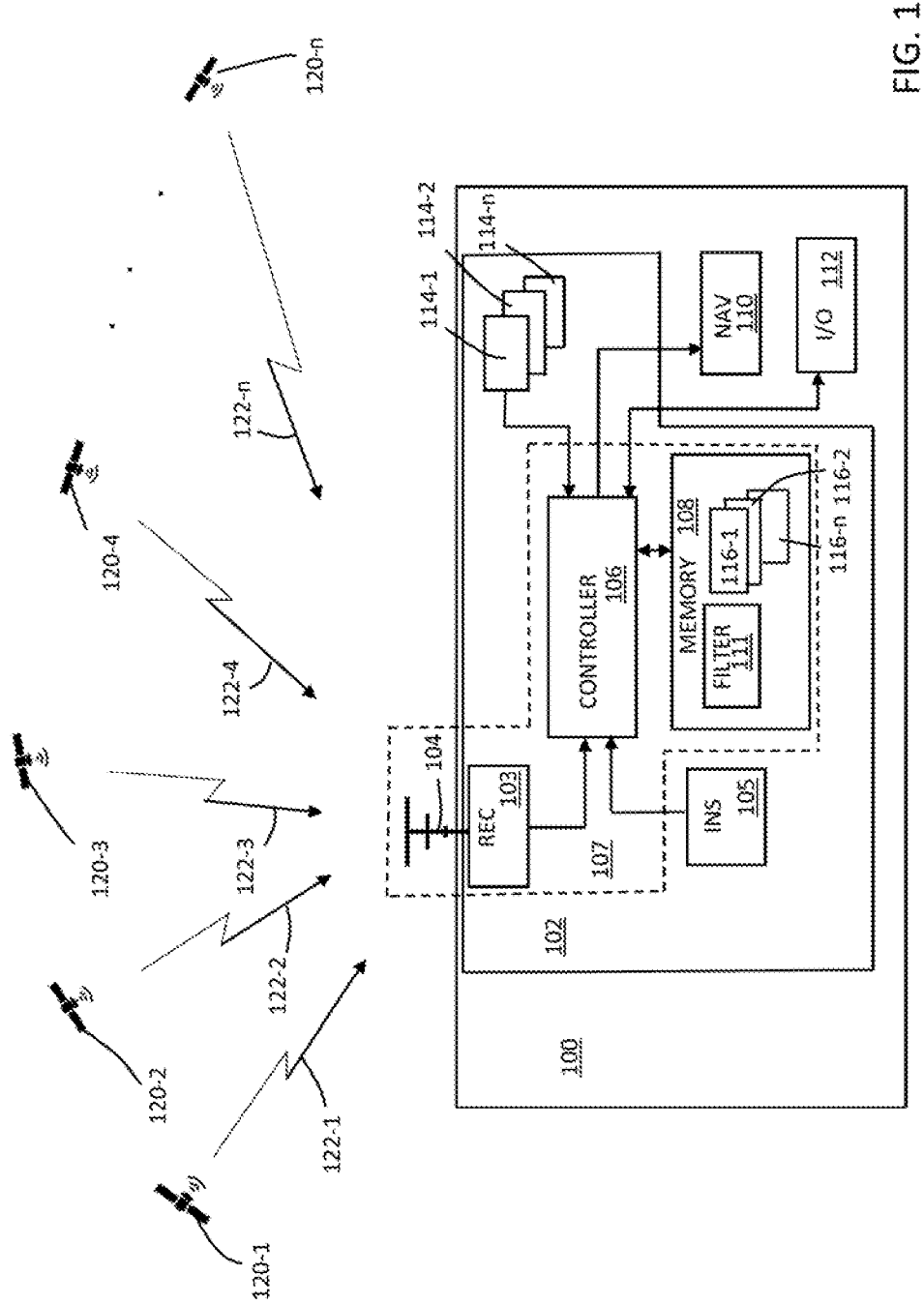
FIG. 1 illustrates a block diagram of a vehicle including a system for detecting signal spoofing by using error state estimates according to one exemplary embodiment.

Embodiments provide a satellite spoofing detection system that uses error state estimates in determining if spoofing of satellite signals are present. Referring to FIG. 1, a vehicle 100 including a system for detecting signal spoofing using error state estimates is illustrated. The vehicle may be an avionic aircraft, such as but not limited to a plane or drone, a land based vehicle, such as but not limited to a car or truck, or a water based vehicle such as but not limited to a ship.

The vehicle 100 in this example, includes at least one antenna 104 to detect satellite signals 122-1 through 122-$n$ from satellites 120-1 through 120-$n$. The satellite signals can generally be identified by 122. Similarly, the satellites can be generally identified by 120. A receiver 103 is in communication with the antenna 104 to receive the detected satellite signals 122. At least one controller 106, that is communication with the receiver 103, is configured to process the satellite signals 122 received from each satellite 120. The processing may include determining raw pseudorange measurements to each associated satellite 120 based on instructions stored in at least one memory 108. The raw pseudorange measurement may be determined by multiplying the speed of light by the time it took for the satellite signal 122 to travel from an associated satellite 120. Since there are many physical effects that occur that may result in synchronization errors between the receiver and satellite clocks, the range determined is a raw pseudorange measurement instead of a true range measurement. The controller 106 employs one or more monitors to determine if the received satellite signals are being spoofed.

In general, the controller 106 may include any one or more of a processor, microprocessor, a digital signal processor (DSP), an application specific integrated circuit (ASIC), a field program gate array (FPGA), or equivalent discrete or integrated logic circuitry. In some example embodiments, controller 106 may include multiple components, such as any combination of one or more microprocessors, one or more controllers, one or more DSPs, one or more ASICs, one or more FPGAs, as well as other discrete or integrated logic circuitry. The functions attributed to the controller 106 herein may be embodied as software, firmware, hardware or any combination thereof. The controller 106 may be part of a system controller or a component controller, such as but not limited to, the receiver controller or navigation controller. The memory 108 may include computer-readable operating instructions that, when executed by the controller provides functions of the satellite signal spoofing detection system. Such functions may include the functions of applying one or more monitors. The computer readable instructions may be encoded within the memory 108. Memory 108 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The controller 106 in embodiments is configured to implement one or more monitors 116-1 through 116-$n$, discussed in detail below, to determine error state estimates that may indicate spooling of the satellite signal is occurring. Error state estimates may be stored in the memory 108. In some embodiments, it is determined if error state estimates are changing at a rate beyond what would be expected. Error state, estimates that change beyond what would be expected may indicate the satellite signals are being spoofed.

The vehicle 100 of FIG. 1 includes a satellite signal spoofing detection system 102 for detecting satellite signal spoofing using sensor state error estimates. The satellite signal spoofing detection system 102 includes sensor 105 (which is an inertial navigation system (INS)) 105 and components for determining navigation state estimates based on received satellite signals generally referenced as a global positioning system (GPS) 107. The INS 105 is a type of sensor that determines changes in angular orientation relative to some reference frame and translational position over a period of time. In an embodiment, the INS may be an inertial reference system (IRS). An IRS is a type of INS that uses gyroscopes and accelerometers to determine changes in angular orientation relative to some reference frame and translational position over a period of time. The vehicle 100 of the example illustrated in FIG. 1, uses a combined GPS/INS system. With an integrated GPS/INS system, the GPS 107 may be used to correct state estimates determined by INS 105. State estimates from the INS 105 tend to drift from true values while, although some noise effects state estimates in a GPS, GPS state estimates are generally not as susceptible to drifting, with any drifting that does occur, being predictable so that mitigation techniques can be employed. One other advantage of using a combined GPS/INS system is that the system allows for smoother position and velocity estimates since the INS 105 can be used to fill in gaps between the GPS positioning determinations.

The vehicle 100 further includes other sensors 114-1 through 114-$n$ that provide further sensor information to the controller 106 upon which the controller may determine state, estimates. The sensors, generally indicated as 114 may include, but are not limited to, altitude sensors, speed sensors, airspeed sensors, direction sensors, etc. As with the INS sensor discussed above, the GPS 107 may be used to correct errors in the state estimates determined by the other sensors 114.

Examples of state estimates include position, velocity, attitude, heading as well as inertial sensor biases, misalignments, scale factors, satellite clock phase, satellite clock frequency, satellite bias states (per satellite). The controller 106 of the satellite signal spoofing detection system 102 inputs sensor state estimates determined from sensor information (INS 105 and sensors 114) and the satellite state estimates from GPS 107 information into filter 111. Filter 111 may be an electronic filter, such as a Kalman filter, that is stored in memory 108. The filter 111, implemented by the controller 106 outputs information related to sensor error estimates. The controller 106 in embodiments, is configured to monitor the sensor error estimates to determine if spoofing in one or more of the satellite signals is present.

Further illustrated in FIG. 1 is an input/output 112 which provides a communication link between an operator and the controller 106. The input/output may include an information input device, such as but not limited to, a keyboard and an output device, such as, but not limited to, a display. Also illustrated in this example embodiment is a navigation system 110 that is in communication with the controller 106. The navigation system 110 may include navigation controls used to control the steering of the vehicle 100. The navigation system 110 further may include a location system that uses the state estimations from the sensors 105 and 114 and the GPS 107 to determine a location of the vehicle 100. In one embodiment, controller 106 is configured to determine location information and then pass it on the navigation system 110. In some embodiments the controller 106 is configured to control the navigation system 110 based at least in part on detected spoofing associated with a satellite signal 122. The control of the navigation system 110 may include, but is not limited to, removing a satellite signal 122 associated with a detected spoofing signal from a location determination and providing a spoofing alert to an operator via display in the input/output 112 or the navigation system 110. The alarm may provide the operator with information regarding the integrity of a determined location.

As discussed above, the at least one controller 106, in embodiments, is configured to apply one or more monitors 116-1 through 116-*n* in determining if a satellite signal 122 is being spoofed. The monitors may generally be identified by 116. An example of a first monitor 116 is an inertial error estimate monitor. The inertial error estimate monitor monitors inertial error state estimates. The inertial error state estimates (or generally sensor error state estimates) are determined by comparing determined sensor state estimates from the sensor (which may be the INS 105) with the satellite state estimates from the GPS 107. In an embodiment, the history of the inertial error estimates are compared with a then current inertial state estimate to determine if the inertial error state estimates are changing in a way (i.e. by a rate, for example), beyond what would be predicted based on known inertial error characteristics. In this example monitor 116, if inertial error state estimates (such as position, velocity, heading etc., state error estimates) are beyond what would be predicted, this may imply one or more of the satellite signals are being spoofed.

A second example monitor 116 is an estimated satellite signal bias error monitor 116. The estimated satellite signal bias error monitor monitors if estimated satellite signal bias errors are changing at a rate beyond expectations. In this example, individual pseudorange measurements from each satellite from more than four satellites are determined and a solution to a state, such as position, is determined from all of the pseudorange measurements. Each pseudorange measurement may then be cross-checked against the solutions provided by the other measurements to determine if errors are changing beyond a rate expected. For example, a separation solution may be employed that removes one pseudorange measurement from the solution at a time and compares the difference between the solution with the pseudorange measurement and the solution without the pseudorange measurement. Further, changes in errors are monitored over time. If pseudorange measurement errors associated with a specific satellite change at rate beyond what is expected, the satellite may be spoofed. For example, if a pseudorange measurement determined by a signal 122 from an associate satellite 120 normally has an error of around 2 meters every hour and suddenly it has an error of 10 meters, a spoofing event may be occurring.

A third example monitor 116 is a common clock error monitor 116. The common clock error monitor 116 monitors common clock errors at the GPS receiver 103. A GPS clock in the receiver 103 may drift over time. When it drifts however, the result is common error across all measurement from all of the satellite signals 122 since it comes from the same clock at the receiver 103 that is used to determine the time it took the satellite signals 122 to travel from their respective satellites 120 to the receiver 103. Generally, the receiver 103 clock drift characteristics are known and can be accounted for when determining pseudorange measurement. In this embodiment if the drift of the GPS receiver is more than expected, spoofing may be present.

A fourth example monitor 116 is an altitude error monitor 116. The altitude error monitor 116 monitors a vertical (altitude) measurement from a sensor 114 and an altitude solution from the GPS 107 to determine if a difference between the sensor and GPS derived altitude indicates that there may be spoofing of one or more satellite signals. An example of sensor 114 providing altitude data is a pressure sensor.

A fifth example monitor is a velocity measurement monitor 116. The velocity measurement monitor 116 monitors differences between a velocity from a sensor 114, such as an airspeed measurement sensor, and a GPS based determined velocity. Changes at rate beyond that expected by a change in wind, etc. may indicate one or more satellite signals are being spoofed. An example of an airspeed sensor is pitot tube. One or more of the above example monitors 116 may be implemented by the controller 106 to determine if spoofing is present in embodiments.

Figure 2:
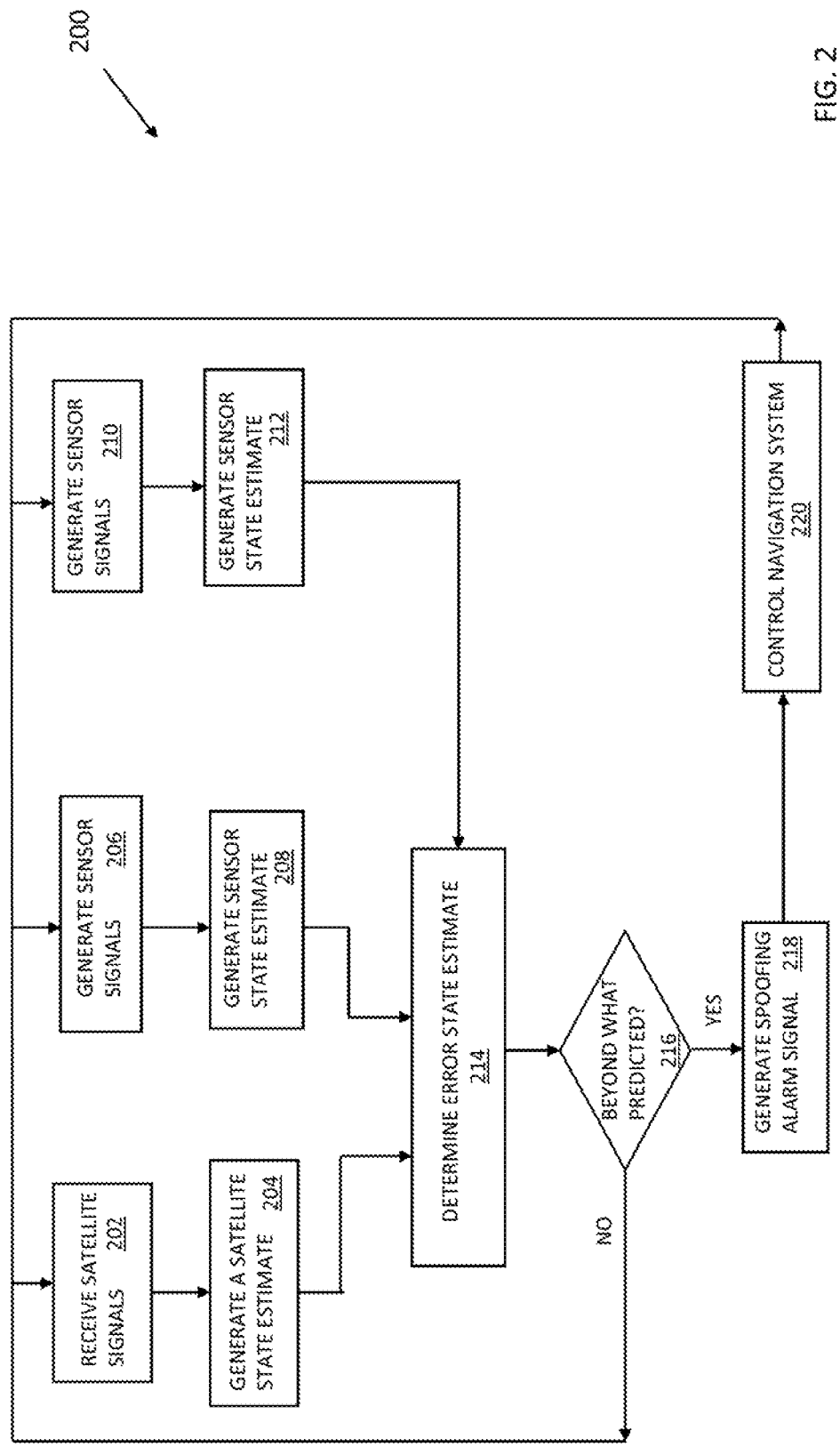
FIG. 2 illustrates a satellite signal spoofing detection flow diagram using error state estimates according to one exemplary embodiment.

FIG. 2 illustrates a satellite signal spoofing detection flow diagram 200 using error state estimates of an example embodiment that is implemented by the at least one controller 106 by executing one or more of the monitors 116 stored in memory 108. The satellite signal spoofing detection flow diagram 200 of FIG. 2 is provided as a series of sequential blocks. The sequence of the blocks may be different in other embodiments including blocks being implemented in parallel. Hence, embodiments are not limited to a specific sequence of blocks.

The satellite signal spoofing detection flow diagram 200 includes receiving satellite signals at block (202). The satellite signals are processed at block (204) to determine a satellite state estimate. In some embodiments, one or more sensor state estimates may be provided by sensor signals as illustrated in FIG. 2. In particular, at block (206) sensor signals are generated by a sensor. An example of a sensor is an INS 105. A sensor states estimate is generated at block (208). Additional sensors may be used to generate sensor signals, such as sensors 114 discussed above. If additional sensors are used, additional sensor signals are, generated at block (210) and processed to determine sensor state estimates at block (212).

The generated satellite state estimate determined at block (204) and the generated sensor state estimates determined at block (208) and block (210) are input into block (214). At block (214) an error state estimate is determined. The error state estimate may be the difference between a sensor state estimate and the satellite state estimate in monitors using the GPS system to correct sensor state information. Further the error state estimate may come solely from the satellite signals as used in the estimated satellite signal bias error monitor and the common clock monitor described above. It is then determined at block (216) if the error state estimate is beyond what would be predicted for an error state estimate. If it is not beyond what would be predicted, the process continues receiving satellite signals at block (202) and generating sensor signals at blocks (206) and (210). In some embodiments, in determining if the error state estimates are beyond what is expected at block (216), past history of the error state estimates are compared with current error state estimates. The past histories may be obtained through a buffer system or an averaging system that keeps a running average the error state estimates. Further in an embodiment, more than one monitor is used determining if the error state estimate is beyond what is expected. For example, in this embodiment the results of one implemented monitor may be compared or verified with the results of a second implemented monitor. Further in an embodiment, more than one sensor can generate the sensor state estimate.

If it is determined at block (214) that the error state estimate is beyond what is expected, a spoofing alarm signal is generate at block (218). The spoofing alarm signal is provided to block (220) where the navigation system 110 may control the vehicle 100 based at least part on the received spoofing alarm signal. The process then continues receiving satellite signals at block (202) and generating sensor signals at blocks (206) and (210).

Examples of satellite signal spoofing detection using inertial state estimates are illustrated in the flow diagrams of FIGS. 3 through 8. The sequence of the blocks may be different in other embodiments including blocks being implemented in parallel. Hence, embodiments are not limited to a specific sequence of blocks illustrated in the flow diagrams of FIGS. 3 through 8.

Figure 3:
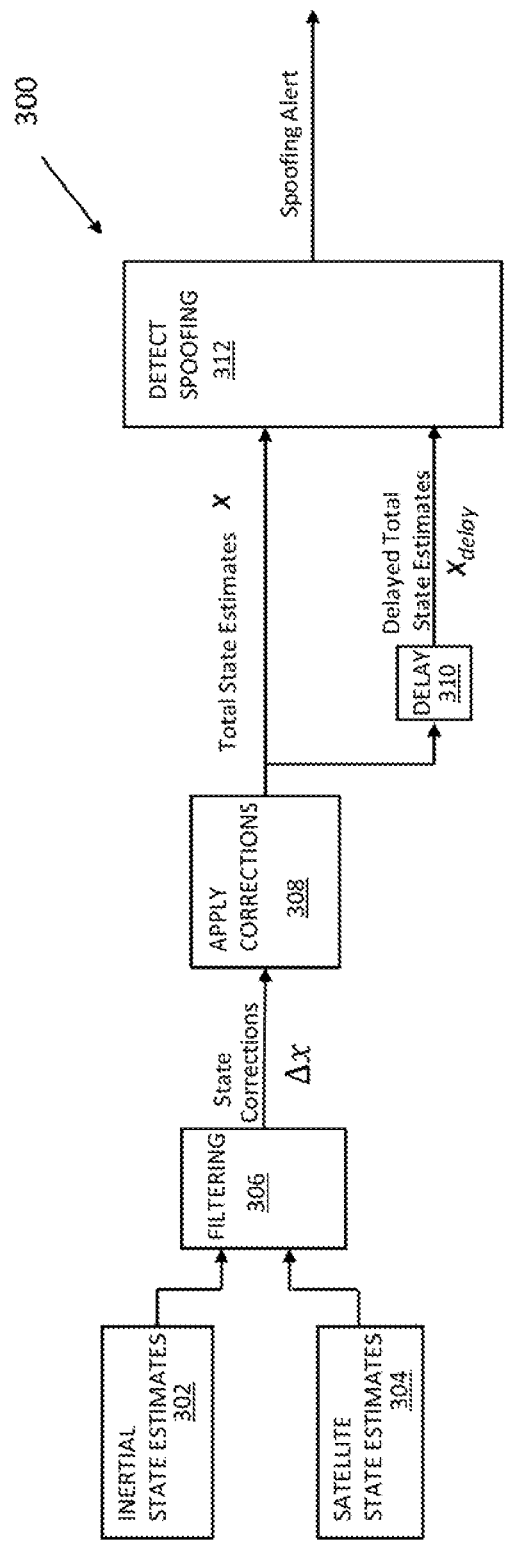
FIG. 3 illustrates a basic satellite signal spoofing detection flow diagram using error state estimates according to another exemplary embodiment.

Referring to FIG. 3, a basic satellite signal spoofing detection flow diagram 300 using error state estimates according to another embodiment is illustrated. In this example, inertial state estimates, that are determined at block (302), are provided to a filtering block (306). Further, satellite state estimates, that is determined at block (304), are also provided to the filtering block (306). At filtering block (306), a filter such as Kalman filter 111, is used by the controller 106 to generate state corrections. The state corrections are applied to the inertial state estimates at block (308) to determine total state estimates. The total state estimates are passed to the detect spoofing block (312) and a delay block (310) in a delay path. The delay block (310) generates past or delayed total state estimates. The delayed total state estimates are also passed to the detect spoofing, block (312).

The detect spoofing block (312), in an embodiment, monitors differences between a then current total state estimate and the delayed state estimate in determining if a spoofing alert should be issued. In one embodiment, if the current total state estimate is increase beyond what would be expected as comparted to the delayed state estimate, a spoofing alert is issued. Further in an embodiment, a threshold is used to determine when a spoofing alert should be generated. The threshold may be determined based on other signals from the filter block (306) that keep track of how sensitive the error estimates are and how much they would be expected to change during a spoofing event.

Figure 4:
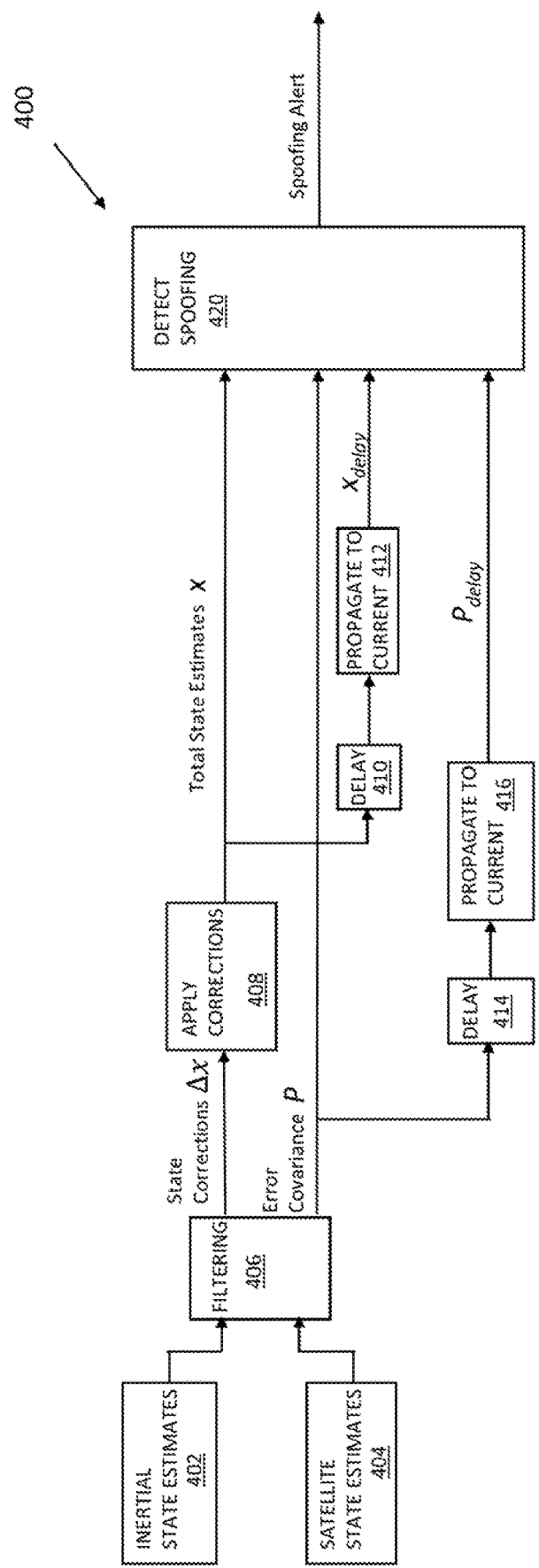
FIG. 4 illustrates a satellite signal spoofing detection flow diagram using error state estimates according to yet another exemplary embodiment.

Another example of a satellite signal spoofing detection flow diagram 400 using error state estimates and a covariance determination to set thresholds is illustrated in FIG. 4. This example embodiment also generates inertial state estimates at block (402) and satellite state estimates at block (404). The state estimates are used at filtering block. (406) to generate state corrections Δx and an error covariance P. An example equation for the state corrections may be Δx=Φx, where Φ is the state translation matrix over a propagation interval. An example of an equation for an error covariance P is P=ΦPΦ$^T$+Q, where Q is the process noise covariance matrix over the propagation interval.

The state corrections Δx are passed to block (408) wherein the total state estimates x are determined. The total state estimates x output from block (408) are passed to an input of a detect spoofing block (420) as well a delay block (410) in a state estimate delay path. The delay block (410) is configured to generate past total state estimates. In this embodiment, an output of the delay block (410) is passed to a propagate to current block (412). The propagate to current block (412) is configured to propagate the delayed total state estimates up to the current time to synchronize the delayed total state estimates with current total state estimates. The propagate to current block (412) outputs delay total state estimates $x_{delay}$ which is passed to the detect spoofing block (420).

The error covariance P output from filter block (406) is also provided to detect spoofing block (420) as well as a delay block (414) in a covariance path. The error covariance P indicates a certainty value for each state solution estimate at a given time. For example, if there is an estimated 10 meters of error in an inertial measurement and it is expected the estimate is within plus or minus 3 meters, the error covariance is plus or minus 3 meters. The covariance is used to set thresholds in this example embodiment. The delay block (414) is configured to generate past error covariances. In one example, a buffer system is used and in another example embodiment and averaging system is, used in the delay block (414). In each example, however, data that reflects past error covariances is used. An output of delay block (414) is passed to a propagate to current block (416). The propagate to current block (416) is configured to propagate the delayed error covariances up to the current time to synchronize the delayed error covariances with the current error covariances P. An output of the propagate to current block (416) is a delayed error covariance $P_{delay}$ which is passed to the detect spoofing block (420).

Figure 5:
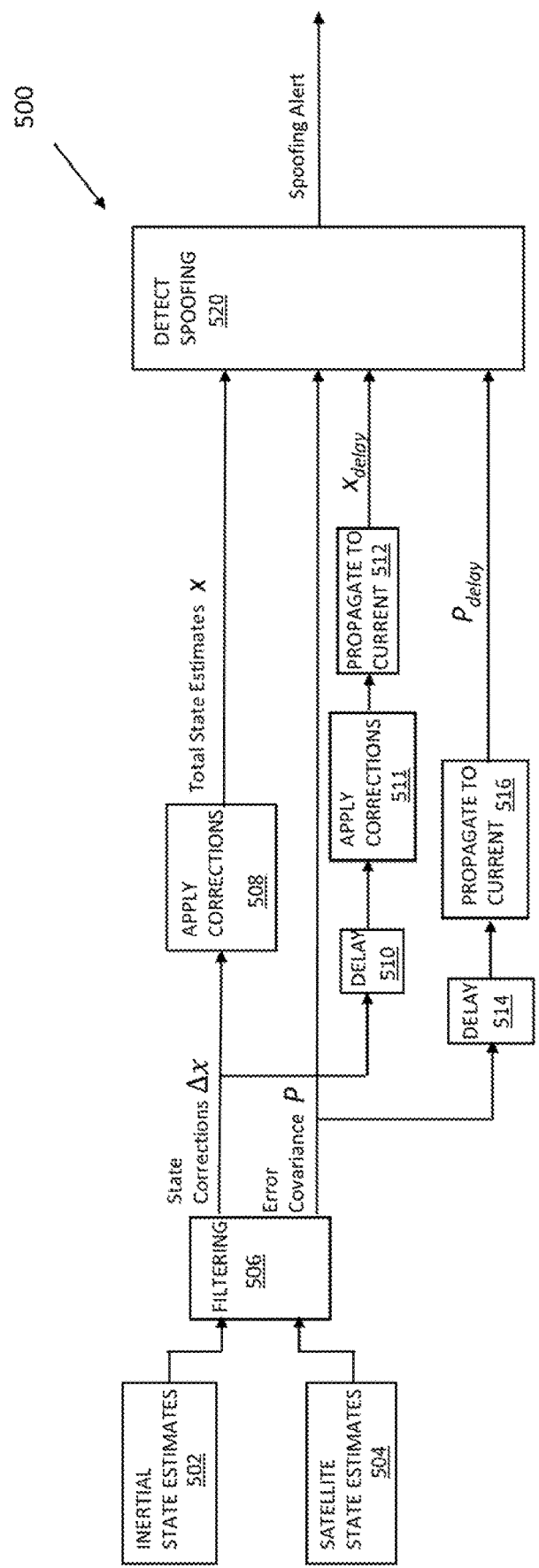
FIG. 5 illustrates another satellite signal spoofing detection flow diagram using error state estimates according to still yet another exemplary embodiment.

Yet another example of a satellite signal spoofing detection flow diagram 500 using error state estimates and a covariance determination to set thresholds is illustrated in FIG. 5. This example embodiment also generates inertial state estimates at block (502) and satellite state estimates at block (504). The state estimates are used at filtering block (506) to generate state corrections Δx and an error covariance P. The state corrections Δx are passed to block (508) wherein the total state estimates x are determined. The state corrections Δx in this example is also passed to delay block (510) in a state estimate delay path. The delay block (510) is configured to generate past total state estimates. In this embodiment, an output of the delay block (510) is passed to block (511) where corrections are applied. An output of block (511) are passed to a propagate to current block (512). The propagate to current block (512) is configured to propagate the delayed total state estimates up to the current time to synchronize the delayed total state estimates with current total state estimates. The propagate to current block (512) outputs delay total state estimates $x_{delay}$ which is passed to the detect spoofing block (520).

The error covariance P output from filter block (506) is also provided to detect spoofing block (520) as well as a delay block (514) in a covariance path. The error covariance P indicates a certainty value for each state solution estimate at a given time. The covariance is used to set thresholds in this example embodiment. The delay block (514) is configured to generate past error covariances. In one example, a buffer system is used and in another example embodiment and averaging system is used in the delay block (514). In each example, however, data that reflects past error covariances is used. An output of delay block (514) is passed to a propagate to current block (516). The propagate to current block (516) is configured to propagate the delayed error covariances up to the current time to synchronize the delayed error covariances with the current error covariances P. An output of the propagates to current block (516) is a delayed error covariance $P_{delay}$ which is passed to the detect spoofing block (520). The spoofing detector 500 may apply the blocks illustrated in FIG. 5 to the total state estimates x, the delayed total state estimates $x_{delay}$, the current error covariance P and the delayed error covariance $P_{delay}$ to determine if a spoofing alert should be issued.

Figure 6:
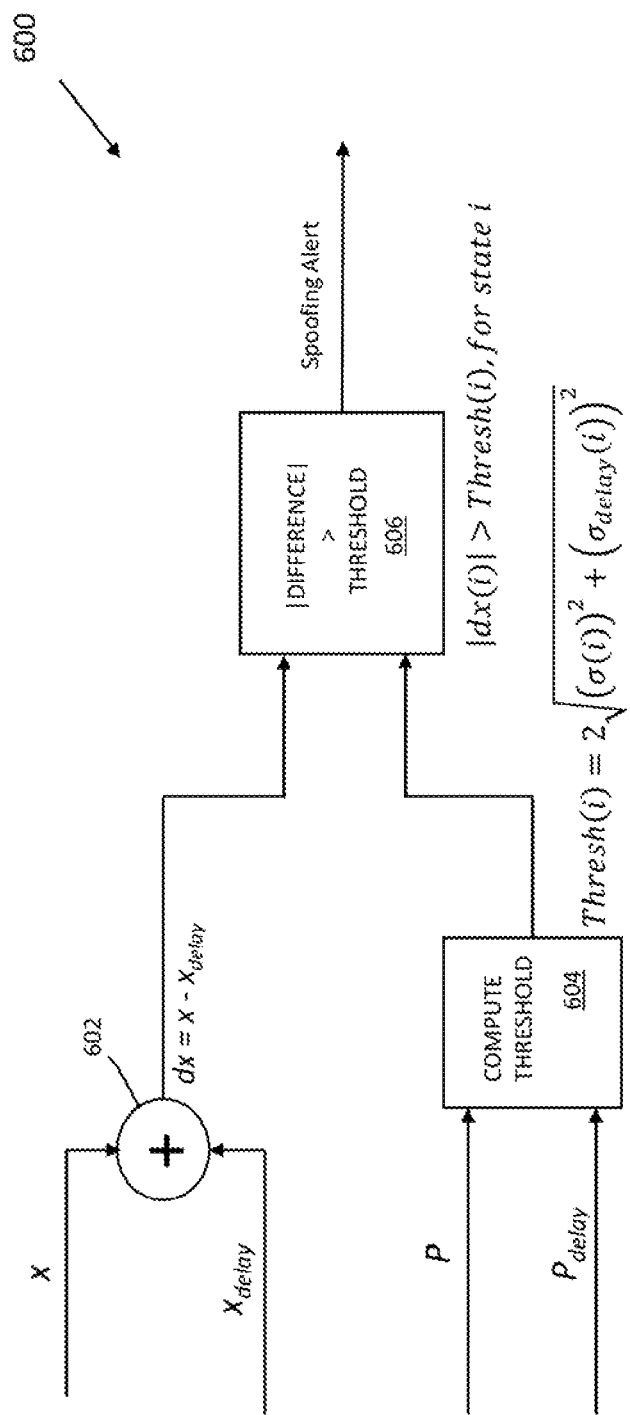
FIG. 6 illustrates spoofing detection flow diagram according to one exemplary embodiment.

An example of a process implemented in the detect spoofing of block (420) of the satellite signal spoofing detection flow diagram 400 and block (520) of a satellite signal spoofing detection flow diagram 500 is illustrated in the spoofing detection flow diagram 600 of FIG. 6. Although this example implements a root sum square operator in determining a then current threshold, other operators may be used in other embodiments. As illustrated in FIG. 6, in this example, a total state estimate x is subtracted from a delayed total state estimate $x_{delay}$ with a mathematical operator 602 to determine a total state estimate difference dx. The threshold is determined with the current error covariance P and the delayed error covariance $P_{delay}$ at block (604). In one example, the threshold is determined with the following equation: $\text{Thresh}(i) = 2\sqrt{(\sigma(i))^2 + (\sigma_{delay}(i))^2}$, for all states I; where $\sigma = \sqrt{\text{diag}(P)}$, and $\sigma_{delay} = \sqrt{\text{diag}(P_{delay})}$.

Determining if a spoofing alert should be generated, is provided at block (606). At block (606) it is determined if an absolute value of the difference $d_x$ is greater than the threshold Thresh(i), for state i. If it is determined at block (606) that the difference $d_x$ is greater than the threshold Thresh(i), a spoofing alert is generated.

Figure 7:
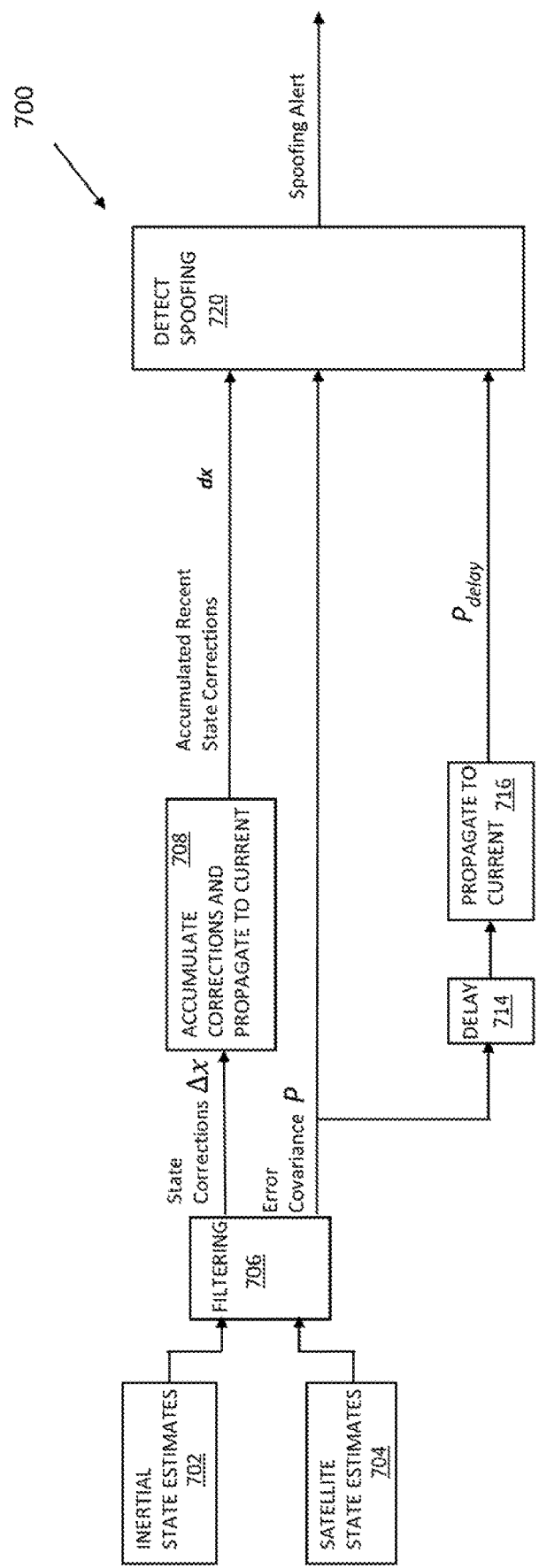
FIG. 7 illustrates a satellite signal spoofing detection flow diagram using error state estimates according to another exemplary embodiment.

Yet another example of a satellite signal spoofing detection floe diagram 700 using error state estimates and a covariance determination to set thresholds is illustrated in FIG. 7. This example embodiment also generates inertial state estimates at block (702) and satellite state estimates at block (704). The state estimates are used at filtering block (706) to generate state corrections Δx and an error covariance P. The state corrections Δx are passed to block (708) where, in this example, corrections are accumulated and propagated to the current to generate accumulated recent state corrections dx. The accumulated recent state corrections dx output from block (708) are passed to an input to detect spoofing block (720). That is, in this embodiment, block (708) performs the functions of comparing the total state estimates with the delayed state estimates to determine the accumulated recent state corrections dx.

One example method of determining the accumulated recent state corrections dx is by using the following equation: $dx(k, k-N) = \Sigma_{i=k-N}^{k} \Delta x_{prop}(k,i)$, where $\Delta x_{prop}(k,i) = \Phi(k, k-i)\Delta x(i)$. Wherein: Δx(i) is the state corrections at time i; Φ(k,k-i) is the state transition matrix from time i to time k; $\Delta x_{prop}(k,i)$ is the state corrections from time i, propagated to time k; and dx(k, k-N) is the accumulated impact of all state corrections between the time k-N and k.

The error covariance P output from filter block (706) is also provided to detect spoofing block (720) as well as a delay block (714) in a covariance path. The error covariance P indicates a certainty value for each state solution estimate at a given time. As discussed above, the covariance is used to set thresholds. The delay block (714) is configured to generate past error covariances. In one example, a buffer system is used and in another example embodiment and averaging system is used in the delay block (714). In each example, however, data that reflects past error covariances is used. An output of delay block (714) is passed to a propagate to current block (716). The propagate to current block (716) is configured to propagate the delayed error covariances up to the current time to synchronize the delayed error covariances with the current error covariances P. An output of the propagate to current block (706) is a delayed error covariance $P_{delay}$ which is passed to the detect spoofing block (720). The detect spoofing block (720) is configured to generate a spoofing alert.

Figure 8:
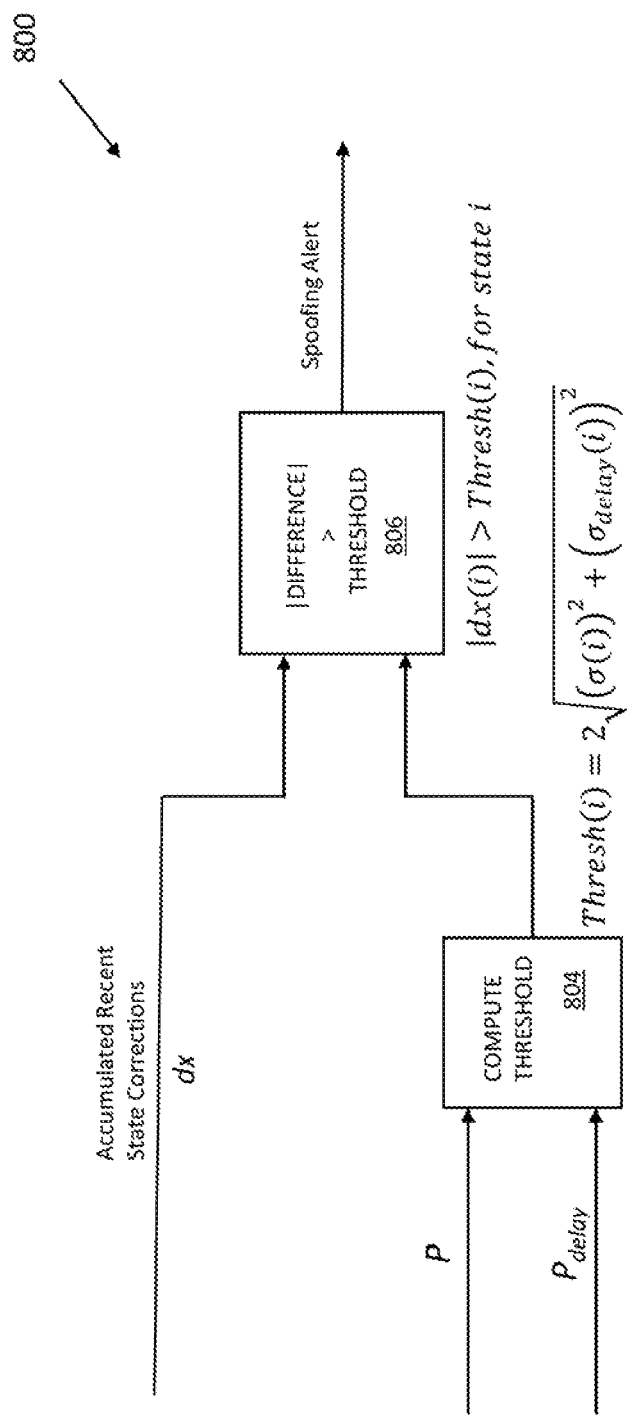
FIG. 8 illustrates a spoofing detection flow diagram according to another exemplary embodiment.

An example of a spoofing detection flow diagram 800 that may be used for the detect spoofing block (720) of the satellite signal spoofing detection flow diagram 700 is illustrated in FIG. 8. This spoofing detection flow diagram 800 may be used where the accumulated recent state corrections dx determined at block (708) is directly input into block (806) of the spoofing detector. The threshold is determined as discussed above with regard to FIG. 6, where:

$\text{Thresh}(i) = 2\sqrt{(\sigma(i))^2 + (\sigma_{delay}(i))^2}$, for all states I; where $\sigma = \sqrt{\text{diag}(P)}$, and $\sigma_{delay} = \sqrt{\text{diag}(P_{delay})}$.

Determining if a spoofing alert should be generated, is provided at block (806). At block (806) it is determined if an absolute value of the accumulated. Recent State Corrections is greater than the threshold Thresh(i), for state it is determined at block (806) that the difference is greater than the threshold Thresh(i), a spoofing, alert is generated.

Figure 9B:
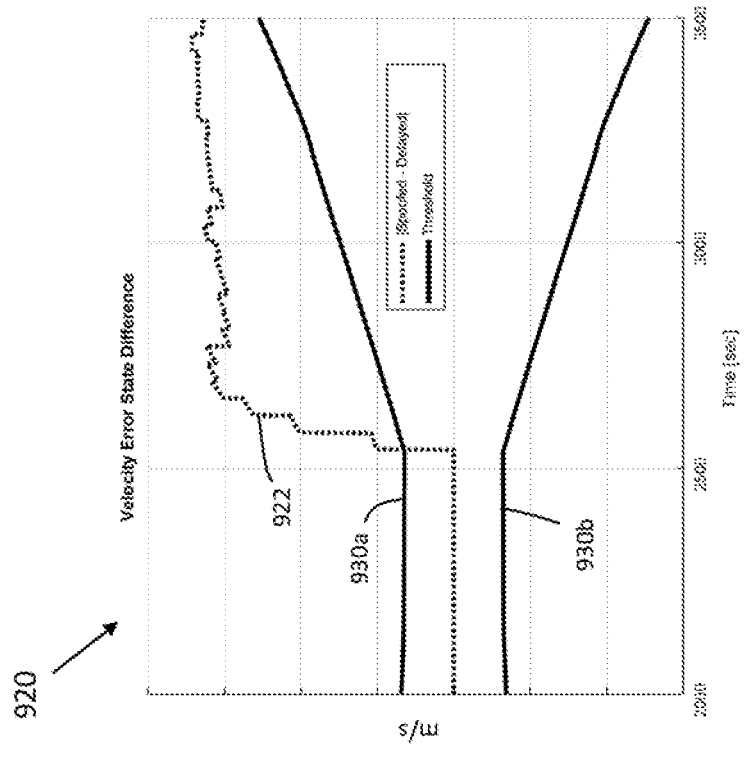
FIG. 9B illustrates a velocity error state difference graph including thresholds according to one exemplary embodiment.
Figure 9A:
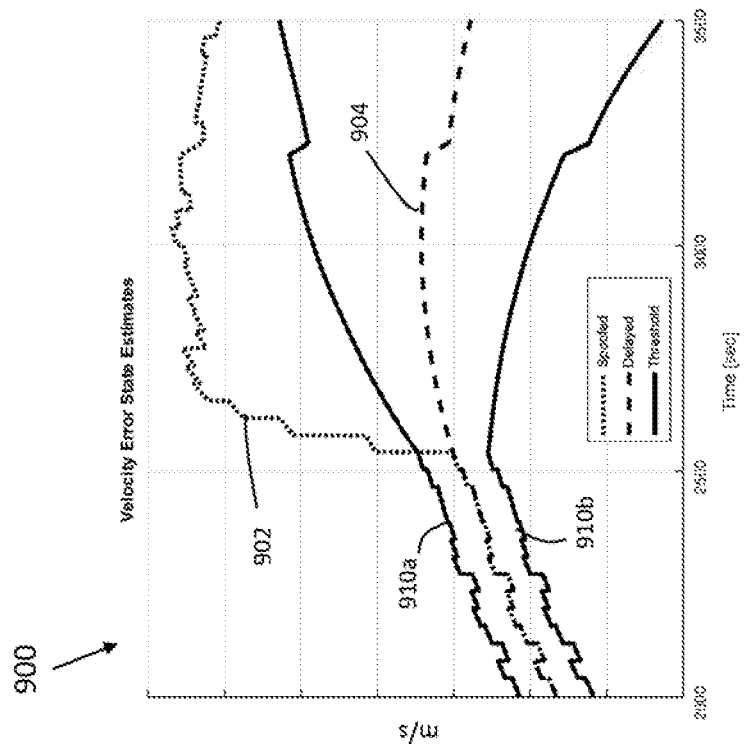
FIG. 9A illustrates a velocity error state estimates graph including thresholds according to one exemplary embodiment.

Referring to the velocity graphs 900 and 920 of FIGS. 9A and 9B, graphical representations of how embodiments are applied to a velocity state are provided. Graph 900 illustrates velocity error state estimates over time. In particular, graph 900 illustrates what happens when a spoofing event occurs. In an example, inertial velocity state estimates are corrected with satellite velocity state estimates. Graph 900 includes thresholds 910a and 910b. Before a spoofing event, a corrected velocity state estimate will track with the delayed velocity state estimate 904. After a spoofing event, at little after 2500 seconds in graph 900, the spoofed velocity state estimate 902 diverges from the delayed velocity state estimate 904. In this scenario, spoofed satellite signals cause the spoofed velocity estimate 902 to diverge past the threshold 910a by incorrectly adjusting the inertial velocity estimate. The delayed state estimate 904, after the diversion, illustrates a more accurate velocity which would be close to the inertial velocity state estimate without corrections derived from the satellite signals. FIG. 9B illustrates a velocity error state difference. Graph 920 illustrates the difference between the velocity state estimate and the delayed velocity state estimate as it would be determined in a detecting satellite signal spoofing using sensor estimate error system described above. As illustrated, the velocity state difference 922 stays within the thresholds 930a and 930b until the spoofing event is encountered, a little after 2500 seconds. At that point the spoofed satellite signals used to adjust the inertial signals cause the velocity state difference 922 (i.e. the difference between the current state estimate x and the delayed state estimate $x_{delay}$) to be greater than the threshold 930a.

Similar graphs for position state estimates are illustrated in FIGS. 10A and 10B. In FIG. 10A the position state estimates are illustrated over time. In particular, graph 1000 illustrates thresholds 1010a and 1010b as well as a delayed position estimate 1004 and a spoofed position estimate 1002. As illustrated, the estimates track with each other until a spoofing event is encountered, a little after 2500 seconds. At that point the spoofed satellite signals cause the spoofed positioned estimate 1002 to deviate from the delayed state estimate. Here again, the delayed position state estimate will be closer to the actual position based on other position information, such as from the INS 105 than state estimates corrected with a spoofed satellite signal. FIG. 10B illustrates a position error state difference. Graph 1020 of FIG. 10B illustrates the difference between the state estimate and the delayed estimate as it would be determined in the detecting satellite signal spoofing using sensor estimate error systems described above. As illustrated, the position state difference 1022 stays below the thresholds 1024 until the spoofing event is encountered, a little after 2500 seconds. At that point the spoofed satellite signals used to adjust the position state estimate information from another sensor causes the position state difference 1022 (i.e. the difference between the current state estimate x and the delayed state estimate $x_{delay}$) to be greater to the threshold 1024.

EXAMPLE EMBODIMENTS

Example 1 includes a system for detecting satellite signal spoofing using error state estimates. The system includes at least one satellite receiver to receive satellite signals, at least one memory and at least one controller. The at least one memory is configured to store at least operation instructions. The at least one controller is in communication with the at least one satellite receiver and the at least one memory. The at least one controller is configured to determine state estimates from the received satellite signals. The at least one controller is further configured to determine error state estimates based at least in part on differences in current state estimates and differences in delayed state estimates. The controller further configured to determine if spoofing is occurring in one more of the received satellite signals when the error state estimates are greater than a select threshold.

Example 2 includes the system of Example 1, wherein the state estimates are one of attitude, heading, velocity, position, inertial sensor bias, misalignment, scale factors, satellite clock phase, satellite clock frequency and satellite bias states.

Example 3 includes a system of any of the Examples 1-2, further including a navigation system to control at least in part navigation of a vehicle. The at least one controller configured to at least in part control information provided to the navigation system based on determined spoofing.

Example 4 includes the system of any of the Examples 1-3, further including at least one sensor. Wherein the determined state estimates include satellite state estimates determined from the satellite signals and sensor state estimates determined from sensor information from the at least one sensor. The at least one controller configured to determine the error state estimates based on differences between the sensor state estimates and the satellite state estimates.

Example 5 includes the system of Example 4, wherein the at least one sensor is at least one of an inertial reference system, an altitude sensor, a velocity sensor and a position sensor.

Example 6 includes the system of any of the Examples 4-5, further including a Kalman filter configured to generate at least one of state corrections and error covariances based on the sensor state estimates and the satellite state estimates.

Example 7 includes the system of Example 6, wherein the at least one controller is further configured to apply the state corrections to the sensor states estimates to generate current total state estimates; delay one of the current total state estimate and the state corrections to generate delayed total state estimates; and compare the current total state estimates with the delayed total state estimates to determine the error state estimates.

Example 8 includes the system of Example 7 wherein the at least one controller is further configured to: determine a current error covariance from the sensor state estimates and the satellite state estimates; delay the current error covariance to generate a delayed error covariance; and determine a threshold based on the current error covariance and the delayed error covariance used to determine if the error state estimates indicate error state estimates beyond what is predicted.

Example 9 includes the system of Example 8, wherein the controller is further configured to: propagate the delayed total state estimates to synchronize the delayed total state estimates with the current total state estimates; and propagate the delayed error covariance to synchronize the delayed error covariance with the current error covariance.

Example 10 includes a method of detecting satellite signal spoofing using error state estimates. The method includes comparing current state estimates with delayed state estimates to determine error state estimates; monitoring the error state estimates; and generating a spoofing alert when the monitored error state estimates indicate error state estimates beyond what is predicted.

Example 11 includes the method of Example 10, wherein the state estimates include sensor state estimates and satellite state estimates, the method further including filtering the sensor state estimates and the satellite state estimates to determine state corrections; applying the state corrections to the sensor states estimates to generate current total state estimates; delaying the current total state estimate to generate delayed total state estimates; and comparing the current total state estimates with the delayed total state estimates to monitor the error state estimates.

Example 12 includes the method of Example 11, further including determining a current error covariance from the sensor state estimates and the satellite state estimates; delaying the current error covariance to generate a delayed error covariance; and determining a threshold based on the current error covariance and the delayed error covariance used to determine if the monitored error state estimates indicate error state estimates beyond what is predicted.

Example 13 includes the method of Example 12, further including, propagating the delayed total state estimates to synchronize the delayed total state estimates with the current total state estimates; and propagating the delayed error covariance to synchronize the delayed error covariance with the current error covariance.

Example 14 includes the method of any of the Examples 10-13, further including receiving satellite signals at least one satellite receiver; and determining the satellite state estimates based on the received satellite signals.

Example 15 includes the method of any of the Examples 10-15, further including verifying a spoofing event by monitoring other error state estimates from another comparison between other state estimates and the satellite state estimates.

Example 16 includes the method of any of the Examples 10-15, wherein the state estimate is one of position, velocity, attitude, heading, inertial sensor biases, misalignments, scale factors, satellite clock phase, satellite clock frequency, satellite bias states.

Example 17 includes a method of detecting satellite signal spoofing using error state estimates, the method includes determining satellite state estimates from received satellite signals; determining sensor state estimates from received sensor signals; comparing the sensor state estimates with the satellite state estimates to determine error state estimates; monitoring the error state estimates; generating a spoofing alert when the monitored error state estimates indicate error state estimates beyond what is predicted; and controlling a navigation system based at least in part on the generated spoofing alert.

Example 18 includes the method of Example 17, further including filtering the sensor state estimates and the satellite state estimates to determine state corrections; applying the state corrections to the sensor states estimates to generate current total state estimates; delaying the current total state estimate to generate delayed total state estimates; and comparing the current total state estimates with the delayed total state estimates to monitor the error state estimates.

Example 19 includes the method of Example 18, further including determining a current error covariance from the sensor state estimates and the satellite state estimates; delaying the current error covariance to generate a delayed error covariance; and determining a threshold based on the current error covariance and the delayed error covariance used to determine if the monitored error state estimates indicate error state estimates beyond what is predicted.

Example 20 includes the method of Example 19, further including propagating the delayed total state estimates to synchronize the delayed total state estimates with the current total state estimates; and propagating the delayed error covariance to synchronize the delayed error covariance with the current error covariance.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A system for detecting satellite signal spoofing using error state estimates, the system comprising:
    at least one satellite receiver to receive satellite signals;
    an inertial navigation system;
    at least one memory, the at least one memory configured to store at least operation instructions; and
    at least one controller in communication with the at least one satellite receiver, the inertial navigation system, and the at least one memory, the at least one controller configured to determine satellite state estimates and inertial state estimates from solutions derived from a plurality of pseudorange measurements determined from the received satellite signals from a plurality of satellites and at least the inertial navigation system, the controller configured to determine error state estimates using the satellite state estimates and the inertial state estimates, the at least one controller further configured to determine spoofing based at least in part on comparing a threshold to a difference between a current error state estimate and delayed error state estimates, wherein the threshold is determined based on known error characteristics of the satellite signals and inertial navigation signals.

2. The system of claim 1, wherein at least the inertial state estimates are at least one of attitude, heading, velocity, position, inertial sensor bias, inertial sensor misalignment, inertial sensor scale factors, clock phase, and clock frequency.

3. The system of claim 1, further comprising:
    a navigation system to control at least in part navigation of a vehicle, the at least one controller configured to at least in part control information provided to the navigation system based on determined spoofing.

4. The system of claim 1, further comprising:
    at least one sensor, to generate sensor state estimates determined from sensor information from the at least one sensor, the at least one controller configured to determine the error state estimates based on differences between the sensor state estimates, the inertial state estimates, and the satellite state estimates.

5. The system of claim 4, wherein the at least one sensor is at least one of an altitude sensor, a velocity sensor and a position sensor.

6. The system of claim 1, further comprising:
    a Kalman filter configured to generate at least one of state corrections and error covariances based on the inertial state estimates and the satellite state estimates.

7. The system of claim 6, wherein the at least one controller is further configured to:
    apply the state corrections to the inertial states estimates and the satellite state estimates to generate current total state estimates;
    delay one of the current total state estimates and the state corrections to generate delayed total state estimates; and
    compare the current total state estimates with the delayed total state estimates to determine the error state estimates.

8. The system of claim 7, wherein the at least one controller is further configured to:
    determine a current error covariance from the inertial state estimates and the satellite state estimates;
    delay the current error covariance to generate a delayed error covariance; and
    determine the threshold based on the current error covariance and the delayed error covariance used to determine if the error state estimates indicate error state estimates beyond what is predicted.

9. The system of claim 8, wherein the controller is further configured to:
    propagate the delayed total state estimates to synchronize the delayed total state estimates with the current total state estimates; and
    propagate the delayed error covariance to synchronize the delayed error covariance with the current error covariance.

10. A method of detecting satellite signal spoofing using error state estimates, the method comprising:
    receiving satellite signals from a plurality of satellites with at least one satellite receiver;
    determining satellite state estimates based on solutions derived from a plurality of pseudorange measurements determined from the received satellite signals;
    receiving inertial state estimates from at least an inertial navigation system;
    determining error state estimates based to the determined satellite state estimates and the inertial state estimates;
    comparing current error state estimates with delayed state error estimates to determine a difference; and
    generating a spoofing alert when the difference between the current error state estimates and the delayed state error estimates is beyond a threshold, wherein the threshold is determined based on known error characteristics of the satellite signals and inertial navigation signals.

11. The method of claim 10, further comprising:
    filtering the inertial state estimates and the satellite state estimates with a Kalman filter to determine state corrections;
    accumulating the state corrections to generate current total state estimates;
    delaying the current total state estimate to generate delayed total state estimates; and comparing the current total state estimates with the delayed total state estimates to monitor the error state estimates.

12. The method of claim 11, further comprising:
determining a current error covariance from the inertial state estimates and the satellite state estimates;
delaying the current error covariance to generate a delayed error covariance; and
determining the threshold based on the current error covariance and the delayed error covariance used to determine if the monitored error state estimates indicate error state estimates beyond what is predicted.

13. The method of claim 12, further comprising:
propagating the delayed total state estimates to synchronize the delayed total state estimates with the current total state estimates; and
propagating the delayed error covariance to synchronize the delayed error covariance with the current error covariance.

14. The method of claim 10, further comprising:
verifying a spoofing event by monitoring other error state estimates from another comparison between other state estimates, the satellite state estimates, and the inertial state estimates.

15. The method of claim 10, wherein the state estimate is at least one of position, velocity, attitude, heading, inertial sensor biases, inertial sensor misalignments, inertial sensor scale factors, clock phase, and clock frequency.

16. A method of detecting satellite signal spoofing using error state estimates, the method comprising:
determining satellite state estimates from a plurality of pseudorange measurements determined from received satellite signals from a plurality of satellites;
determining inertial state estimates from received inertial sensor signals;
using the inertial state estimates and the satellite state estimates to determine error state estimates;
monitoring the error state estimates;
generating a spoofing alert when a difference between a present error state estimate and at least one delayed error state estimate is beyond a threshold, wherein the threshold is determined based on known error characteristics of the satellite signals and the inertial navigation signals; and
controlling a navigation system based at least in part on the generated spoofing alert.

17. The method of claim 16, further comprising:
filtering the inertial state estimates and the satellite state estimates with a Kalman filter to determine state corrections;
applying the state corrections to determine state corrections to generate current total state estimates;
delaying the current total state estimate to generate delayed total state estimates; and
comparing the current total state estimates with the delayed total state estimates to monitor the error state estimates.

18. The method of claim 17, further comprising:
determining a current error covariance from the sensor state estimates and the satellite state estimates;
delaying the current error covariance to generate a delayed error covariance; and
determining the threshold based on the current error covariance and the delayed error covariance used to determine if the monitored error state estimates indicate error state estimates beyond what is predicted.

19. The method of claim 18, further comprising:
propagating the delayed total state estimates to synchronize the delayed total state estimates with the current total state estimates; and
propagating the delayed error covariance to synchronize the delayed error covariance with the current error covariance.

20. The method of claim 16, further comprising at least one of:
using the inertial state estimates to smooth out satellite state estimates between satellite state determinations; and
using the satellite state estimates to correct the inertial state estimates.

* * * * *